Feb. 5, 1952  G. TAUBERT  2,584,941
CUP DISPENSER
Filed Aug. 4, 1948  5 Sheets-Sheet 1

Inventor
GEORGE TAUBERT

ATTORNEY

Feb. 5, 1952 — G. TAUBERT — 2,584,941
CUP DISPENSER

Filed Aug. 4, 1948 — 5 Sheets-Sheet 2

Inventor
GEORGE TAUBERT
ATTORNEY

Feb. 5, 1952 — G. TAUBERT — 2,584,941
CUP DISPENSER
Filed Aug. 4, 1948 — 5 Sheets-Sheet 3
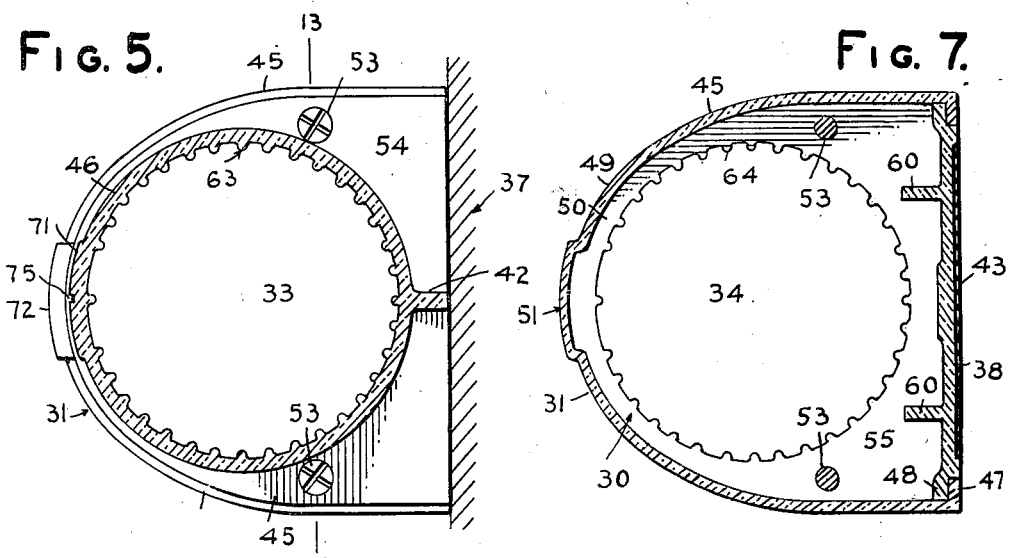
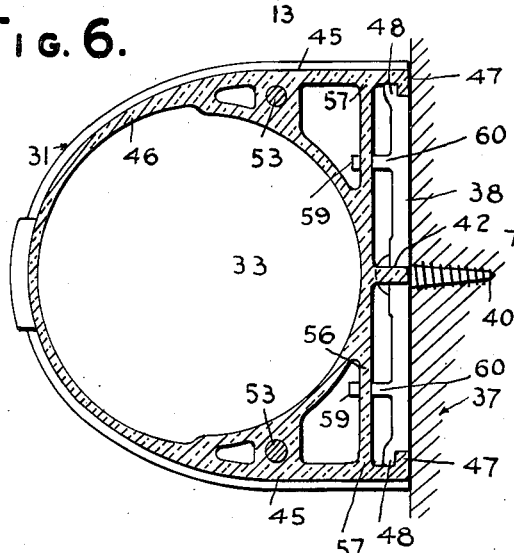
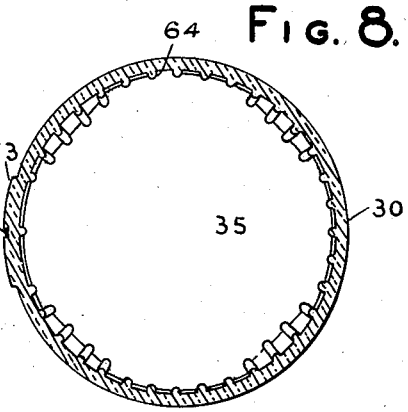
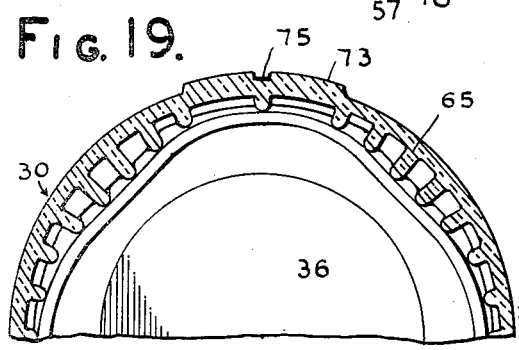
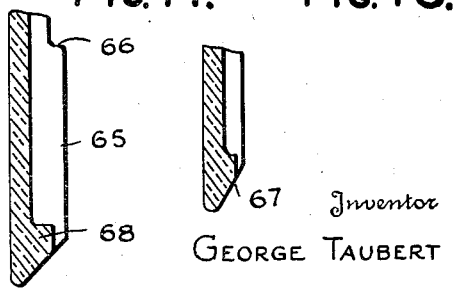
Inventor
GEORGE TAUBERT Feb. 5, 1952 G. TAUBERT 2,584,941
CUP DISPENSER
Filed Aug. 4, 1948 5 Sheets-Sheet 4

Inventor
GEORGE TAUBERT

ATTORNEY

Feb. 5, 1952 G. TAUBERT 2,584,941
CUP DISPENSER
Filed Aug. 4, 1948 5 Sheets-Sheet 5

Inventor
GEORGE TAUBERT

ATTORNEY

Patented Feb. 5, 1952

2,584,941

UNITED STATES PATENT OFFICE 2,584,941

CUP DISPENSER

George Taubert, Mount Vernon, N. Y., assignor to Dixie Cup Company, Easton, Pa., a corporation of Delaware Application August 4, 1948, Serial No. 42,451

8 Claims. (Cl. 312—43)

This invention relates to a cup dispenser of a type that may be readily and cheaply manufactured, easily and efficiently installed, and durable in service.

While primarily designed for home or office use, the dispenser is formed and adapted for use most anywhere it may be desirable to support and present a stack of paper or similar cups from which individual cups will be convenient for use.

In a device of the general character referred to, it is a fundamental characteristic that the same be of neat and attractive appearance, constructed of elements effectually connected together to constitute a container, and provided with means for securely supporting the same on the surface of a wall or the like.

The main body of the container may be formed of any suitable rigid or nearly rigid material. It is, however, preferably made of a molded plastic which may be transparent so that the cups contained therein, which may be of striking color and design, or decoration, are in part visible through the container wall portions to correspondingly present a pleasing and artistic exposed and outside view of the cups being dispensed.

An ancillary feature of the device comprises novel means for operatively associating or connecting the parts of the container so that the physically separate elements thereof, the means for fastening them together, and the instrumentalities for supporting the same from the wall or equivalent surface, are substantially concealed, that is, so arranged as to be hidden from view exteriorly of the device.

Another feature resides in constructing the container or dispenser so that it has a decorative outside appearance and is provided with vertical ribs on its inside surface which guide the stack of cups and also serve to strengthen the walls of the container. In the event the container is made of transparent material these vertical ribs also serve to prevent scratching of the inner surface of the container and thus prevent marring its appearance. In addition, short vertical ribs are provided adjacent the lower open or discharge end of the dispenser to retain the stack when the lowermost cup of the stack is removed.

The container or dispenser is made preferably in two parts which are interfitted at approximately the center of the dispenser. The lower half of the dispenser is adapted to be secured by suitable means to a vertical surface such as a wall. The two halves may be secured together so that a stack of cups may be inserted in the container through the open bottom, or the upper half may be removed while the stack of cups is dropped into the lower half after which the upper half is replaced.

The foregoing and other characteristics of the invention, together with the details thereof will be clear from the accompanying drawings wherein the preferred embodiment of the invention is illustrated, when considered in connection with the specific description hereinafter contained.

In the drawings:

Figure 5 is a horizontal section on the line 5—5 of Figure 3.

Figure 6 is a horizontal section on the line 6—6 of Figure 3.

Figure 7 is a horizontal section on the line 7—7 of Figure 3.

Figure 8 is a horizontal section on the line 8—8 of Figure 3.

Figure 17 is a section on the line 17—17 of Figure 15.

Figure 18 is a similar section on the line 18—18 of Figure 15.

Figure 19 is a view similar to that of Figure 15 showing the manner of partially bending or distorting the wall of cups passing through the device to obtain a firm hold of the cups by and within the container.

Figure 1:
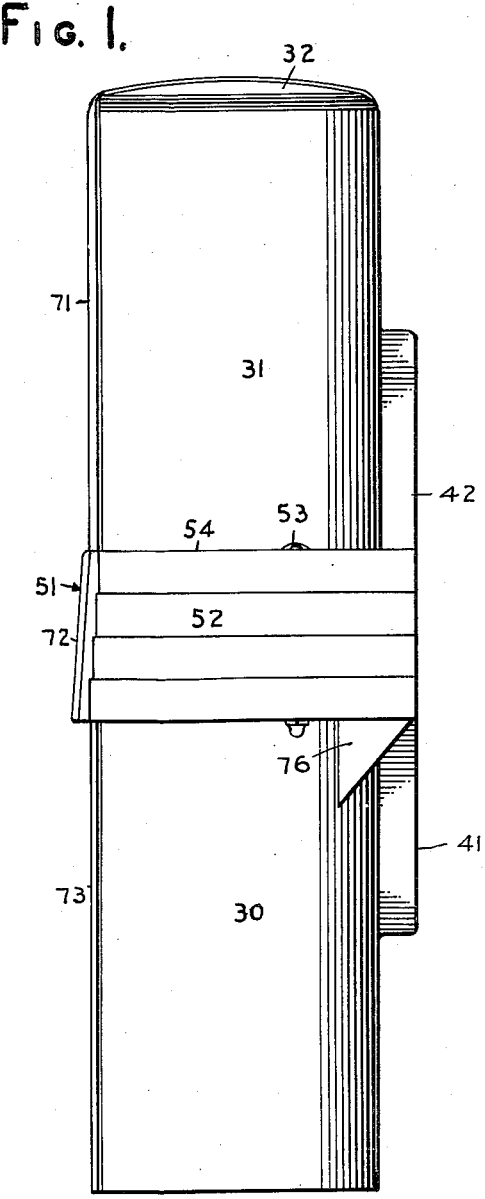
Figure 1 is a side view of the dispenser.

Referring more specifically to the drawings, wherein like reference numerals refer to the same parts in the several views, 30 designates the lower half or supporting section of an elongated cylindrical casing for containing and supporting a stack of cups such as customary nested paper cups, the upper half or section of the container being represented at 31, closed at its top 32. These sections 30 and 31 are connected together as hereinafter pointed out, the upper section being open at its lower end 33, and the lower section open both at its upper end 34 and lower or discharge end 35 so that when the sections are combined in unitary form the center thereof constitutes a continuous substantially uniform center cup-receiving chamber or passageway.

The sections 30 and 31 of the container or dispenser are conveniently and preferably molded of clear plastic material so that cups as 36 of fanciful color or decorative type may be seen through the wall of a dispenser and effect a nicety of appearance through and exteriorly of the dispenser. The plastic material especially suitable for the formation of the container is that styled "Polystyrene" because of its rigidity and strength and substantial permanence against warping, cracking or breaking, as well as lending itself to cheap and easy molding to the shape and conformation desired in facilitating the ready fitting and mounting of the sections of the dispenser relative to each other.

Figure 3:
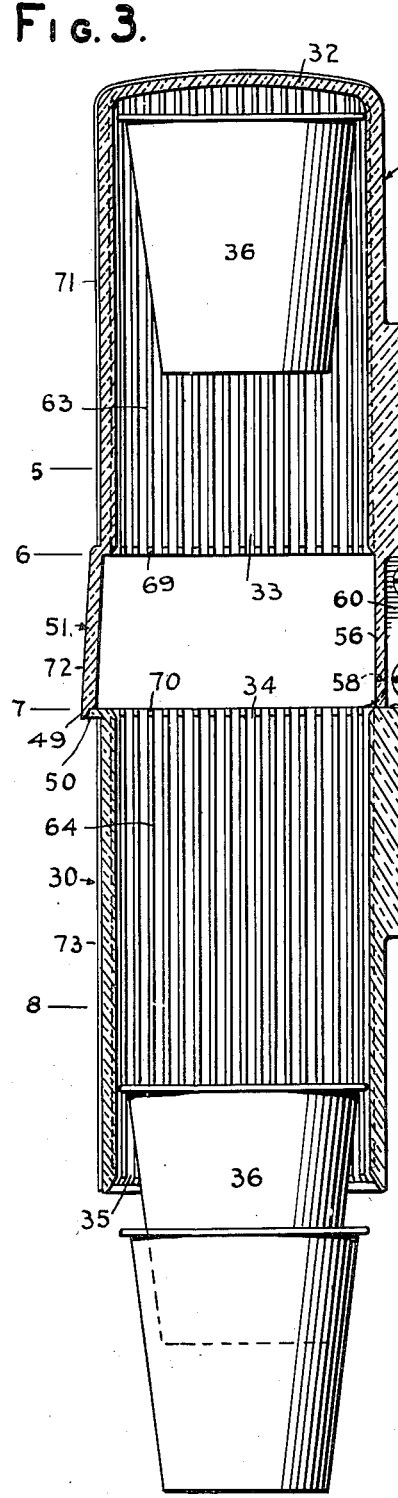
Figure 3 is a vertical section of the dispenser and its mounting illustrating some of the cups therein, and omitting others to better enable illustration of interior mechanical construction.
Figure 4:
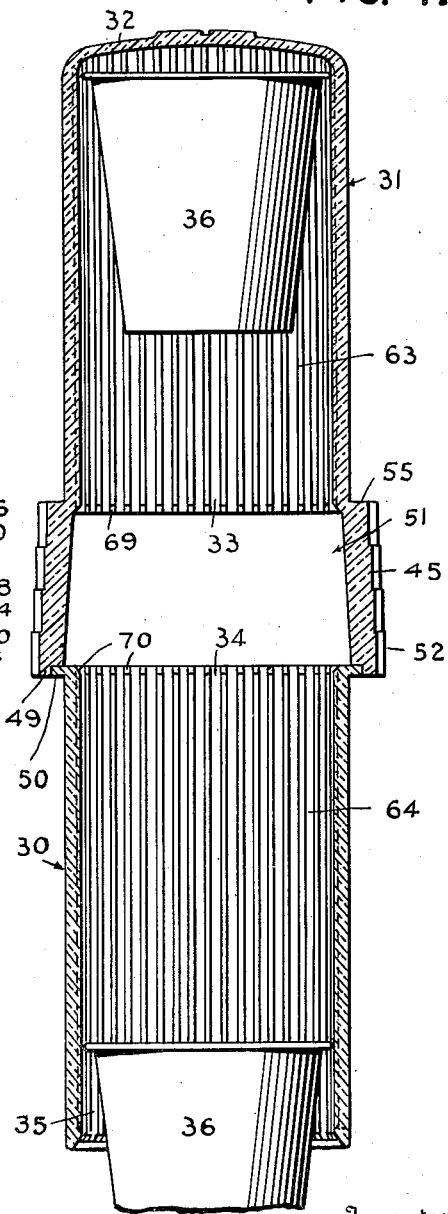
Figure 4 is a like sectional view in a plane at right angles to the section of Figure 3.
Figure 9:
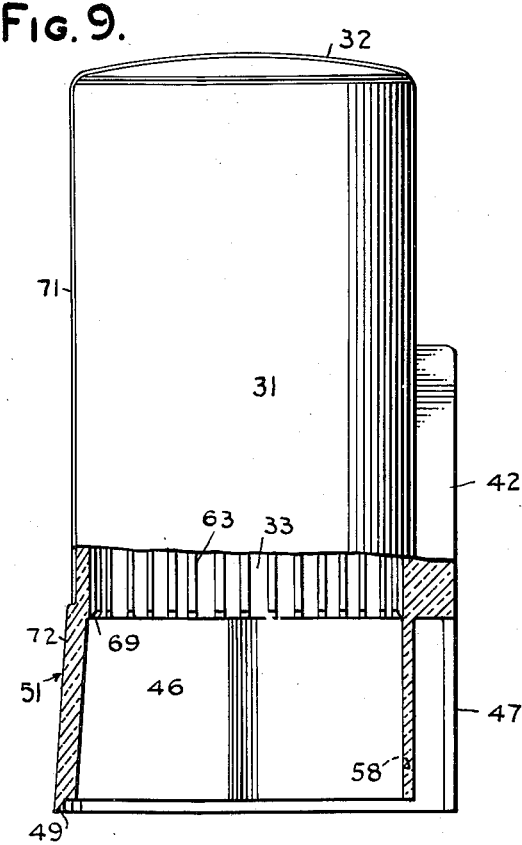
Figure 9 is a side view of the upper section of the dispenser, the lower portion of the same being shown in vertical section.

For the sake of clearness in illustration, a full stack of cups, as intended, is not illustrated in the drawings, Figures 3 and 4, but simply the top and bottom cups of the stack, the absent intermediate cups making way for a full showing of the inner formation of the side walls of the upper and lower sections of the dispenser.

The lower section 30 of the dispenser, or the supporting section, as the same has been termed, is designed to be permanently secured to the face of a wall or, for example, a woodwork thereof, fragmentarily illustrated at 37. For this purpose the section 30 has a generally flat oblong panel 38, integrally united with and projecting upwardly from the back edge of the lower section and provided with apertures or screw holes 39, for the passage of screws 40 in fastening the lower section 30 to the wall 37 or the like, the fastening screws 40 being arranged in spaced relationship in order to hold the section in true vertical position against any deflection or movement on the wall.

Below this panel 38 is a vertical rib 41 of somewhat elongated character, bridging the space between the tubular body of the section 30 and the wall and bearing against the wall to reinforce or steady the section when in use. The upper section 31 has a similar rib 42 arranged and functioning for substantially the same purpose.

Instead of employing screws, as 40, to support the dispenser on a wall, as an alternative arrangement, the rear face of the panel 38 has a hollow outer face 43 in which a flat piece of adhesive or strip of material to constitute an adhesive mounting, may be secured and moistened exteriorly to correspondingly secure itself and the dispenser section 30 to the wall or other support 37, as will be appreciated. Such adhesive strip is illustrated, for example, at 44 in Figure 3.

Now, referring to the interfitting of the upper and lower sections 31 and 30, whereby the former is connected to the latter and supported thereby, it will be seen that the opposite side walls 45 (Figure 6) of the section, branch rearwardly from and are integral with the tubular formation 46 of the upper section 31, and terminate in inwardly turned flanges 47 adapted to be slid behind and correspondingly interlock with the opposite grooved side edges 48 of the panel 38, integral with the secured lower or supporting section 30 of the dispenser.

Cooperating with the interfitted portions 47 and 48 of the upper and lower sections, is the otherwise interfitting of the upper and lower sections together constituted by the flanged and recessed bottom edge 49 around the upper section 31, receiving the complemental flanged portions 50 at the top edge of the section 30. It will be appreciated that the interfitting of these edges of the two sections 30 and 31, combined with the overlapped rear side edges 47 and 48, will securely hold the upper section 31 in stable condition at all times without the necessity of furnishing fastening devices in addition to those already defined in connection with the secure mounting of the lower section 30 of the dispenser.

The lower seating and flanged portion 49 of the upper section 31 is formed with an integral belt-like portion or apron 51 constituting a depending part of the upper section 31 and enveloping the space approximately bridged at the center of the dispenser by the panel 38. The apron portion 51, just referred to, is exteriorly surfaced or fancifully shaped as at 52 to enhance the appearance of the device and increase the thickness of the wall sufficient to provide the flange and seating portion 49, the special shape shown being an upwardly receding stepped configuration which, while preserving the general transparency of the construction even at the middle portion thereof, will substantially conceal the fastening devices thereabout, for instance, the vertical tying bolts and nuts 53 passing through the lateral plate portions or extensions 54, intervening the apron 52 and the tubular portion 46 of the upper section 31, and the complemental plate portions 55 of the lower section.

To substantially conceal the fastening panel 38 and screws therein, when employed either with, or in lieu of, the adhesive strip 43, the top section 31 has a depending wall 56 projecting downwardly therefrom in front of said panel 38, spaced from said panel and at its ends integral with the end walls 45, as at 57, Figure 6.

The bottom portion of the wall 56 is open or cut away as at 58 to accommodate the feet extensions 59 projected slightly forwardly from and forming portions of vertical strengthening ribs 60 arranged vertically on the inner face of the panel 38. The feet ends of these ribs 60 are adapted to connect with the upper end 61 of the lower section 30 of the dispenser, whereas, the bottom edge of the corresponding back rib 42, on the upper section 31, will rest upon the top edge 62 of the panel 38 when the upper section is slid over and forced home to the predetermined position on the lower section 30.

The cups, heretofore designated 36, are customarily flanged at their open ends, the mouth of the cups being of a diameter slightly less than the diameter of the cup chamber or passageway within the combined sections 30 and 31, and the major portions of the interiors of both sections are molded with a multiplicity of inwardly projecting parallel ribs 63 and 64 respectively, to constitute free contact surfaces on the corresponding walls of the dispenser sections 30 and 31 to make easy descending of the stacked cups through the dispenser to near the open end 35 of the latter.

The ribbing 63 of the interior correspondingly serves the additional and important purpose of preventing undue or excessive rubbing of the cups over the inner surface of the container which might scratch or mar the appearance of the same as it is seen from the outside thereof through the transparent walls of the same.

The stack of cups may be introduced into the dispenser open end upward through the bottom of the dispenser, to the extent that the dispenser will accommodate the stack, and the stack is supported and held in place by the specially formed ribs until cups are forcibly withdrawn from the stack through the open end 35 of the container in the following manner.

Figure 12:
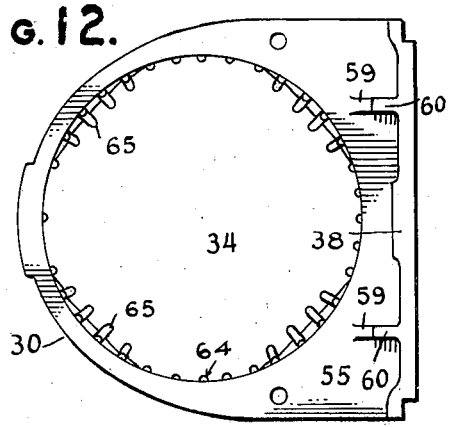
Figure 12 is a top view of the same.
Figure 16:
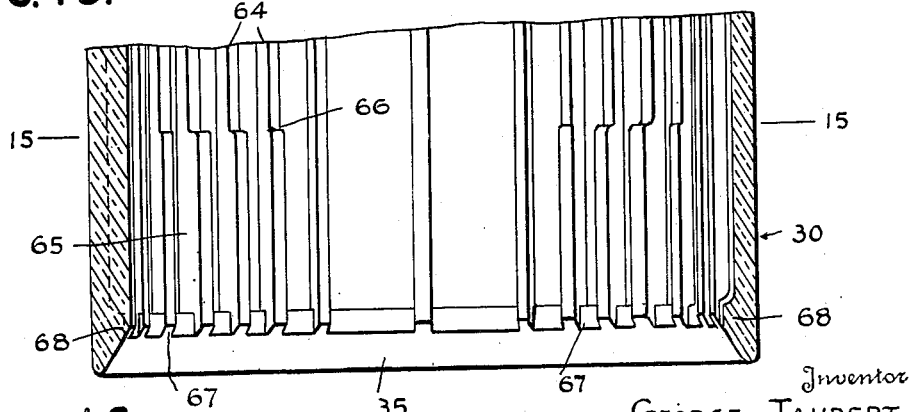
Figure 16 is an enlarged vertical section of the lower end portion of the lower section of the dispenser.

The ribs 63 and 64 already referred to, are not intended as impediments to the downward lowering or feeding of the cups, but are essentially for the purpose of enabling free and easy passage of the cups and for preserving the inner face of the dispenser sections as set forth. However, there are somewhat similar enlarged ribs or extensions 65 at the lower end of the section 30 extending a substantial distance upwardly within the lower section, as appears particularly in Figure 16. These rib portions 65 are preferably not in a continuous series entirely around the interior of the section 30, as in the case of the ribs 63 and 64, but are rather in spaced series as suggested in Figures 12 and 19, where four series are illustrated for a special purpose, as will appear. The ribs of each series all terminate in a common plane to provide supporting shoulders 66 on which the stack of cups may be supported. Also, ribs of each series decrease in depth in opposite directions, that is, circumferentially of the tubular section and from the central relatively deeper ribs to the outer relatively shallower ribs of the series. Therefore, when withdrawing a cup from the stack the wall of the cup in the four suggested areas will be gradually distorted, bent or depressed (see Figure 19) to serve in resisting the removal of the cup or holding the same in the container until forcibly withdrawn.

The bottom edge of the dispenser section 30 has an upwardly and inwardly tapering edge 67 adjoining a thickened rounded portion 68 of the wall of the section to add strength thereto and afford a smooth, forcible introduction of a stack of cups through the end into the container with all or most of the cups above the supporting shoulders 66 of the ribs 65, and with perhaps a few cups in position to be immediately withdrawn, unobjectionably distorted (Figure 19), to retain them in the dispenser until pulled therefrom.

To facilitate the feeding of the cups through the dispenser sections 30 and 31, the inwardly projecting ribs thereof are appropriately beveled at their ends, that is, the lower ends of the ribs 63 beveled or rounded at 69 and the upper ends of the ribs 64 beveled or rounded at 70.

Figure 2:
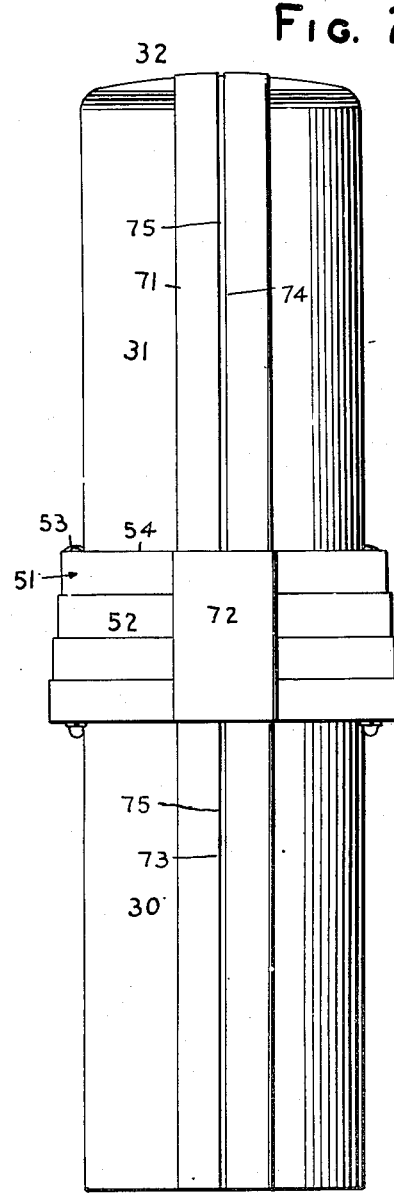
Figure 2 is a front view thereof.
Figures 13, 14:
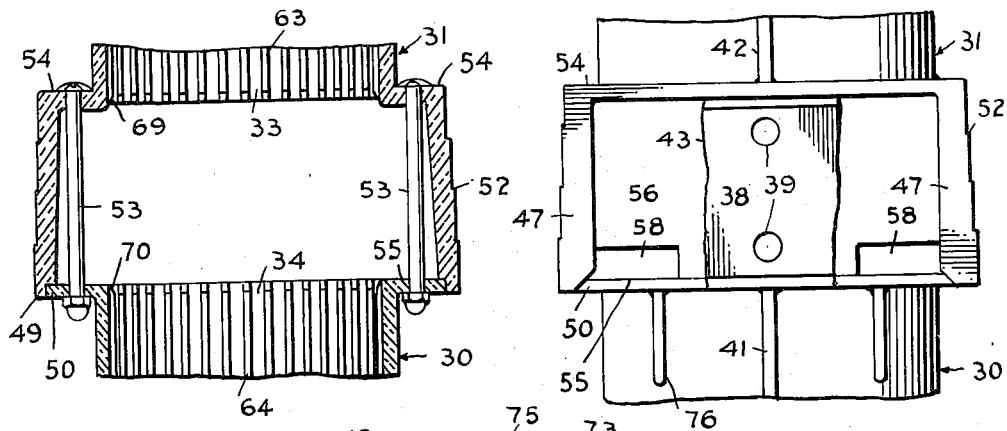
Figure 13 is a vertical section on the line 13—13 of Figure 5 to make clear the manner of fastening the upper and lower sections together.
Figure 14 is a rear view of the meeting portions of the upper and lower sections.
Figure 15:
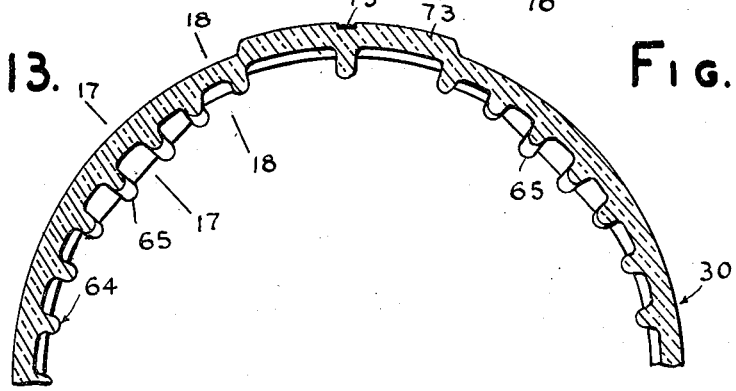
Figure 15 is an enlarged fragmentary sectional view on the line 15—15 of Figure 16.

When the dispenser is mounted with its sections joined together, and supported on a wall or equivalent surface, it has the general appearance of continuity, that is, the upper and lower sections 30 and 31 appear to be continuous and passing through the intermediate belt-like or apron formation 51—52 and both the upper and lower sections, as well as the depending or apron portion of the upper section are molded to constitute, when assembled together, a forwardly projected ornamental and strengthening enlargement or strip 71 extending throughout the front of the dispenser and over the closed top portion thereof. The portion 72 of this enlargement or strip on the apron is well adapted to constitute a name plate or equivalent surface for additional ornamentation, if desired, and the portions 73 extending along the lower section, and the portions 74 extending upwardly along the upper section and over the top thereof are grooved longitudinally as represented at 75 (Figures 2 and 13) for the reception of a pigment or coloring matter, if it is desired to so embellish the structure.

Recalling that the top or cap section 31 of the dispenser is simply slipped over the upper end of the lower section 30, with the interfitting flange portions 47 and 48 cooperating with the interfitting flange and groove portions 49 and 50, it is pointed out that the latter is shaped to conform to the contour of the enlargement or strip 71, and these parts as interfitted may then be fastened together through the medium of the bolts and nuts 53 at the opposite sides of the device, as hereinbefore described or by any other suitable fastening means. It is not necessary in the use of the dispenser that the upper and lower halves be fastened together. In fact, if the two halves are not so fastened the dispenser may be filled by removing the upper half while a new stack of cups is dropped into the lower half.

Figure 11:
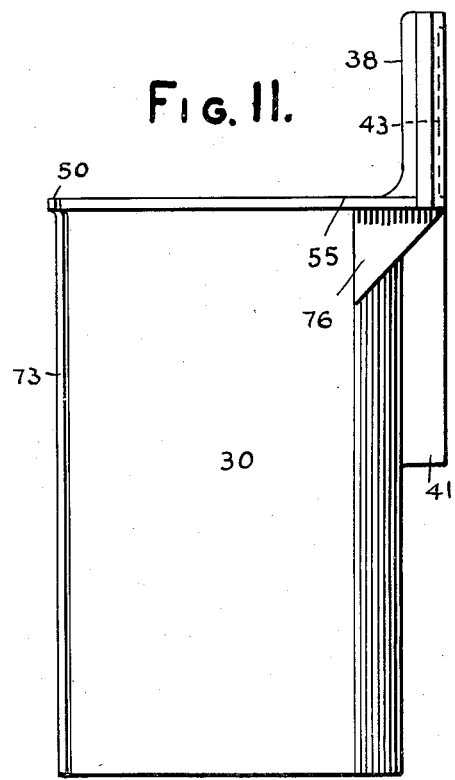
Figure 11 is a side view of the lower section of the dispenser.
Figure 10:
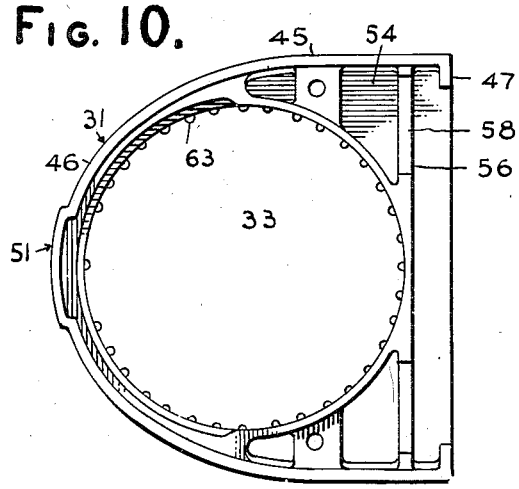
Figure 10 is a bottom view of the same.

Opposite extensions of the flanges 50 extend in parallel relationship towards the rear of the dispenser into the plate formation 55 (Figure 12) and this plate (Figs. 12 and 13) and the structure thereabove, including the superimposed top section, is abundantly supported by the tubular construction of the plastic lower section 30, supplemented, if found expedient, by the integral brackets 76 extending somewhat tangentially relative to the curved wall of the section 30, and formed integrally therewith and with the bottom of the plate 55 referred to (Figures 1 and 11).

It will be appreciated that by the construction of the dispenser herein referred to a device, of greatly pleasing appearance is constituted, one of practical and efficient operation for domestic or home use afforded, and one capable of long continuous use with practically no or minimum necessity for repair. There are practically no movable working parts of the apparatus, the only operation required being to introduce the stack of cups into the dispenser and remove a cup at a time by manual effort as desired. The inserted stack is supported on the ledge or rest constituted by the shoulders 66 on the relatively enlarged ribs or portions thereof at the discharge end of the dispenser, and held as they proceed to the exit opening 33 by the deflection or bending of the wall of the cup, by the corresponding ribs (Figure 19) to bind and hold the cups until intentionally withdrawn by a pull of the hand.

I claim:

1. A dispenser for a stack of drinking cups, comprising upper and lower superimposed tubular sections of plastic material, one of the sections at approximately the juncture of said sections having a rearwardly offset panel portion for securing the same to a supporting surface, the other section having rearwardly offset flange extensions adapted to interfit the said panel portion, and means to fasten the panel portion to the supporting surface.

2. A dispenser for a stack of drinking cups, comprising upper and lower superimposed tubular sections of plastic material, one of the sections at approximately the juncture of said sections having a rearwardly offset panel portion for securing the same to a supporting surface, and the other section having rearwardly offset flange extensions adapted to interfit with the said panel portion, and fastening means for said panel portion, in combination with a reinforcing partition extending laterally from the upper section to and connected with the flange extensions.

3. A dispenser for a stack of drinking cups, comprising upper and lower superimposed tubular sections of plastic material, one of the sections at approximately the juncture of said sections having a rearwardly offset panel portion for securing the same to a supporting surface, and the other section having rearwardly offset flange extensions adapted to interfit with the said panel portion, and fastening means for said panel portion, in combination with a reinforcing partition extending laterally from the upper section to and connected with the flange extensions, said partition having openings at its lower edge portion, and vertical ribs on the inner face of the panel adjacent to and engaging the partition and formed to project in part through said openings and secured to the lower section.

4. A dispenser for a stack of drinking cups, comprising upper and lower superimposed tubular sections, one of the sections at approximately the juncture of said sections having an integral rearwardly offset portion for securing the same to a supporting surface, and the other section having complemental integral portions to interfit with said rearwardly offset portion to maintain the sections together, and upwardly and downwardly extending ribs at the back of the upper and lower sections above and below said offset securing portion adapted to afford bearing surfaces against the said supporting surface.

5. A dispenser for a stack of drinking cups, comprising upper and lower superimposed tubular sections, one of the sections at approximately the juncture of said sections having an integral portion offset relative to the rear of the dispenser for securing the same to a supporting surface, the other section having complemental integral interfitting portions housing said securing means, the interior of said sections being of substantially circular cross-section throughout the length of the sections and the offset securing means and housing portion being lateral projections formed to engage the supporting surface, and the interfitting portions housing said securing means including oppositely projected flanged members adapted to engage behind edges of the securing means.

6. A dispenser for a stack of drinking cups, comprising a body of tubular form, said body being provided with integral spaced longitudinally extending ribs whereby said cups are held out of contact with the body as the cups pass to a dispensing station, and modified rib portions at the dispensing station wherein some of the ribs are increased in depth to provide shoulders to support the stack of cups, the modified rib portions being in separate series circumferentially of the body, and the ribs of each series being of varying depth decreasing toward the opposite ends of the series.

7. A dispenser for a stack of drinking cups comprising upper and lower tubular sections, the upper section being provided with an outwardly extending circumferential flange at its lower end, an apron extending downwardly and outwardly from said flange and having a seat in its lower edge, the lower section being provided with an outwardly extending circumferential flange spaced from the flange of the upper section and received in the seat of the apron, a panel at the rear of said dispenser for securing the same to a support and extending vertically from the flange of the lower section, said apron including rearwardly extending portions to house said panel and having interlocking engagement therewith, and means passing through the flanges to secure the sections together.

8. A dispenser for a stack of drinking cups comprising upper and lower tubular sections, the upper section being provided with an outwardly extending circumferential flange at its lower end, an apron extending downwardly and outwardly from said flange and having a seat in its lower edge, the lower section being provided with an outwardly extending circumferential flange spaced from the flange of the upper section and received in the seat of the apron, a panel at the rear of said dispenser for securing the same to a support and extending vertically from the flange of the lower section, vertical ribs formed as a part of the panel and extending inwardly therefrom, said apron including rearwardly extending portions to house said panel and have interlocking engagement therewith, reinforcing partitions connected to the rearwardly extending portions of the apron and positioned to be engaged by the ribs of the panel, and means passing through the flanges to secure the sections together.

GEORGE TAUBERT.

REFERENCES CITED

The following references are of record in the file of this patent:

UNITED STATES PATENTS

| Number | Name | Date |
|---|---|---|
| 1,043,854 | Luellen | Nov. 12, 1912 |
| 1,651,857 | Wilkinson | Dec. 6, 1927 |
| 2,141,682 | Carew | Dec. 27, 1938 |